United States Patent [19]

Sato et al.

[11] Patent Number: 4,683,858
[45] Date of Patent: Aug. 4, 1987

[54] APPARATUS FOR CONTROLLING ENGINE

[75] Inventors: Yoshihisa Sato, Nagoya; Masumi Kinugawa, Okazaki; Susumu Akiyama, Kariya; Toshitaka Yamada, Nagoya; Tiaki Mizuno, Toyota; Atsushi Suzuki, Obu, all of Japan

[73] Assignee: Nippondenso Co., Ltd., Kariya, Japan

[21] Appl. No.: 863,938

[22] Filed: May 16, 1986

[30] Foreign Application Priority Data

Jun. 17, 1985 [JP] Japan ................. 60-131270

[51] Int. Cl.$^4$ ............... F02D 41/34; G01M 15/00
[52] U.S. Cl. ................. 123/486; 73/118.2; 73/204; 123/488; 123/494; 364/431.05
[58] Field of Search ............ 123/478, 486, 488, 480, 123/494; 73/118.2, 204, 861.02, 861.03; 364/431.05

[56] References Cited

U.S. PATENT DOCUMENTS 3,765,380 10/1973 Rachel et al. ............. 123/494
3,818,877 6/1974 Barrera et al. ............ 123/494
4,279,146 7/1981 Wessel et al.
4,596,138 6/1986 Ito et al. ................ 73/204 X

FOREIGN PATENT DOCUMENTS 6415 1/1983 Japan ..................... 73/204

Primary Examiner—Tony M. Argenbright
Attorney, Agent, or Firm—Cushman, Darby & Cushman

[57] ABSTRACT

In an apparatus for controlling an engine, as an air flow sensor for measuring intake air flow quantity, a heater resistor having temperature-resistance characteristic and a temperature sensitive resistor for sensing air temperature are provided in an intake passage, and heating electric power is supplied to the heater resistor in response to a start signal generated periodically. The heating electric power is cut off when the temperature of the heater resistor is raised to a specified reference temperature predetermined in accordance with the air temperature, so that an output signal indicative of the time width in which the heating electric power is supplied is applied to an electronic control unit to measure air flow quantity therefrom. Further, compensation coefficient stored in a memory is derived in correspondence to the intake air temperature sensed by the temperature sensitive resistor, and the output signal is compensated for by the compensation coefficient to compensate the measured air flow quantity. Based on the compensated air flow quantity, fuel injection quantity, ignition timing or the like is computed in the electronic control unit.

8 Claims, 8 Drawing Figures

4,683,858

APPARATUS FOR CONTROLLING ENGINE

BACKGROUND OF THE INVENTION

The present invention relates to an apparatus for controlling an engine in accordance with engine operating conditions, and more particularly to an apparatus for controlling fuel injection quantity, ignition timing or the like in accordance with intake air flow quantity.

In an engine of an automobile, for instance, fuel injection quantity, ignition timing or the like is controlled by an electronic control unit (ECU) utilizing a micro-computer. In such electronic control unit, detection signals from sensors sensing engine operating conditions are applied to the control unit to be used therein for controlling the engine. For instance, the sensors sense respectively engine rotational speed, coolant temperature, throttle opening, air-fuel ratio and battery voltage of an engine. Further, intake air flow quantity which is most relevant to engine control, fuel injection quantity control, is sensed by an air flow sensor and detection signal thereof is applied to the control unit. As the air flow sensor for measuring intake air flow quantity used in engine control, various ones such as heat-wire type disclosed in U.S. Pat. No. 4,279,146 are known.

In the heat-wire type air flow sensor, a heater resistor having a specified temperature-resistance characteristic is provided in an intake passage of the engine so that the heating of the same is controlled by heating electric power supplied thereto. The temperature rising speed of the heater resistor supplied with the heating electric power is monitored. Since the heater resistor is exposed in the intake air flow, heat dissipation from the heater resistor corresponds to the intake air flow quantity. That is, if the intake air flow quantity increases, the temperature rising speed becomes slow. To keep the temperature condition of the heater resistor at a reference temperature, larger heating electric power is required as the intake air flow quantity increases.

In this type of air flow sensor, temperature condition of the heater resistor is sensed in relation to the temperature of air flowing through the intake passage sensed by a temperature sensitive resistor. However, in fact, the temperature measurement characteristic of the heater resistor is greatly influenced by the temperature of the environment. For instance, in a cold condition where the temperature is lowered to −20° C., it becomes difficult to accurately measure intake air flow quantity. To compensate for dependency on the air temperature, a compensation resistor is connected to the temperature sensitive resistor. However, the compensation resistor only compensates for the temperature dependency linearly with respect to the sensed air temperature. This means that it becomes difficult to control the fuel injection quantity, ignition timing or the like precisely.

SUMMARY OF THE INVENTION

It is a primary object of the present invention to eliminate the above-described disadvantages.

It is a further object of the present invention to eliminate dependency on air temperature in measuring intake air quantity so that engine control is performed precisely.

In an apparatus for controlling an engine according to the present invention, as an air flow sensor for measuring intake air flow quantity, a heater resistor having temperature-resistance characteristic and a temperature sensitive resistor for sensing air temperature are provided in an intake passage, and heating electric power is supplied to the heater resistor in response to a start signal generated periodically. The heating electric power is cut off when the temperature of the heater resistor is raised to a specified reference temperature predetermined in accordance with the air temperature, so that an output signal indicative of the time width in which the heating electric power is supplied is applied to an electronic control unit to measure air flow quantity therefrom. Further, compensation coefficient stored in a memory is derived in correspondence to the intake air temperature sensed by the temperature sensitive resistor, and the output signal is compensated for by the compensation coefficient to compensate the measured air flow quantity. Based on the compensated air flow quantity, fuel injection quantity, ignition timing or the like is computed in the electronic control unit.

DETAILED DESCRIPTION OF THE PREFERRED EMBODIMENT

Figure 1:
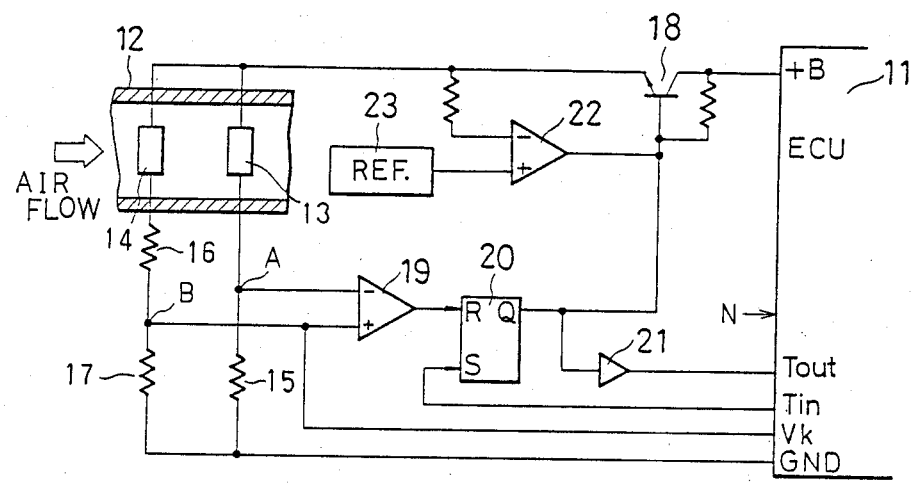
FIG. 1 is a schematic view showing an engine control apparatus according to an embodiment of the present invention.

The present invention will be described hereinbelow with reference to embodiments shown in the drawings.

As shown in FIG. 1, a heater resistor 13 and a temperature sensitive resistor 14 are provided within an intake passage 12 of an engine. The heater resistor 13 such as a platinum wire positioned downstream the resistor 14 has temperature-resistance characteristic by which resistance thereof is varied in accordance with the temperature thereof and generates heat by heating electric power supplied thereto. The heater resistor 13 is exposed to the intake air flowing through the intake passage 12. The temperature sensitive resistor 14 such as a platinum wire varies resistance thereof in correspondence to the intake air temperature.

A resistor 15 having a low fixed resistance is connected to the heater resistor 13 in series, and resistors 16 and 17 having high fixed resistances are connected to the temperature sensitive resistor 14 in series. The resistors 13 through 17 constitute a bridge circuit. An electric power source +B from an electronic control unit 11 is connected to the bridge circuit through a heating electric power switching device constituted by a transistor 18.

A junction A between the resistors 13 and 15 and a junction B between the resistors 16 and 17 used as output terminals of the bridge circuit are connected to a comparator 19. The comparator 19 generates a positive output signal when the bridge circuit is balanced, that is, temperature of the heater resistor 13 is raised to a reference temperature predetermined by the air temperature sensed by the temperature sensitive resistor 14. The output signal from the comparator 19 is applied to a reset terminal of a flip-flop circuit 20 functioning as a bistable circuit. The flip-flop circuit 20 is driven into a set condition by a start signal Tin generated from the control unit 11. Under the set condition, a positive output signal in the form of pulse is applied to the transistor 18 so that the electric heating power is supplied to the bridge circuit in which the heater resistor 13 generates heat. The positive output signal produced when the flip-flop circuit 20 is in the set condition is applied through a buffer 21 to the control unit 11 as an air flow quantity signal. The start signal Tin is periodically generated preferably in response to a signal synchronized with engine rotation.

The voltage of the heating electric power supplied through the transistor 18 to the bridge circuit is applied through a resistor to an operational amplifier 22. A reference voltage signal from a reference voltage source 23 is applied to the operational amplifier 22 to be compared with the voltage of the heating electric power. The base of transistor 18 is controlled by an output signal from the operational amplifier 22 so that the voltage of the heating electric power is regulated to the reference voltage. An air temperature signal VK produced from the junction B and corresponding to the temperature of air in the intake passage 12 measured by the temperature sensitive element 14 is applied to the control unit 11 to be used for compensating the air flow quantity signal.

Figure 2:
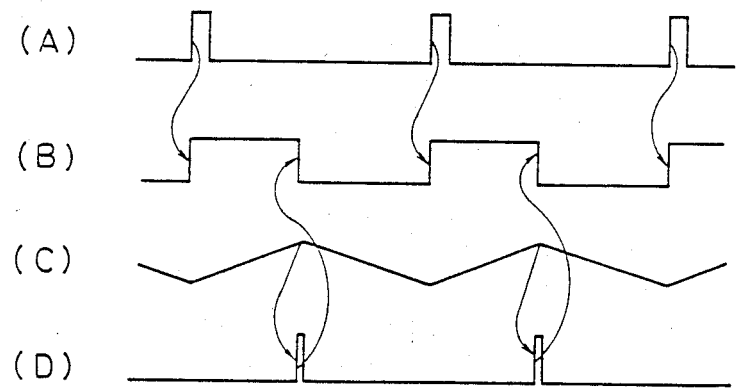
FIGS. 2(A-D) show waveforms of signals developed in the embodiment shown in FIG. 1.

According to the air flow sensor described hereinabove, the start signal Tin is generated periodically from the engine control unit 11 in synchronizm with engine rotation as shown in (A) of FIG. 2, and the flip-flop circuit 20 is driven into the set condition. When the flip-flop circuit 20 is set to produce the output signal rising positively as shown in (B) of FIG. 2, the transistor 18 is turned on to supply the heating electric power or the electric current to the bridge circuit including the heater resistor 13 so that the heater resistor 13 is generates heat by the heating electric power the voltage of which is controlled constant. Since the heater resistor 13 is exposed to the air flow in the intake passage 12, the heat dissipation from the heater reisrtor 13 is determined by the intake air flow quantity. Under the condition that the heating electric power of the constant voltage is supplied, the temperature rising speed of the heater resistor 13 becomes slow as the air flow quantity increases. That is, the temperature of the heater resistor 13 changes as shown in (C) of FIG. 2. As this temperature increases, the resistance of the resistor 13 increases and the voltage at the junction A decreases responsively. When this temperature is raised to the reference temperature determined in relation to the air temperature measured by the temperature sensitive resistor 14, the comparator 19 generates the positive output signal as shown in (D) of the FIG. 2 and the flip-flop circuit 20 is driven into the reset condition as shown in (B) of FIG. 2. In response to the resetting of the flip-flop circuit 20, the heating electric power to the heater resistor 13 is cut off so that the time width in which the heating electric power is supplied corresponds to the intake air flow quantity in the intake passage 12. This pulse width is applied as the air flow quantity signal Tout to the control unit 11. After supply of the heating electric power to the bridge circuit is cut off, the temperature of the heater resistor 13 decreases until the start Tin generated again as shown in (C) of FIG. 2.

The air flow quantity signal Tout of the air flow sensor has the following characteristic relative to the intake air temperature Ta.

$$Tout = a \times Ta + b \text{ (a and b: variables)}$$

This means that the air flow quantity signal Tout is dependent on the air temperature Ta. To eliminate dependency on the intake air temperature, the air flow quantity signal Tout must be compensated, for instance, by multiplying a compensation coefficient KA shown by a curve A in FIG. 3. As would be understood from FIG. 3, the compensation coefficient KA is expressed as C/Ta (C:variable) and nonlinear relative to the intake air temperature Ta. The compensation resistor 16 in the bridge circuit is effective to compensate the temperature dependency to some extent and, in substance, results in compensating the air flow quantity signal linearly with compensation coefficient KB expressed as $d \cdot Ta + e$ (d and e: variables) as shown in a curve B in FIG. 3.

Figure 3:
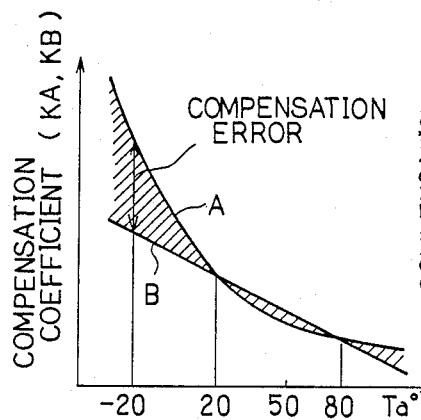
FIG. 3 is a graph showing compensation coefficients relative to air temperature.

In the circuit configuration of the above-described embodiment, even if the compensation resistor 16 is used to perform the temperature compensation so that the compensation error is nullified at intake air temperatures 20° C. and 80° C., substantial compensation error still remains at other intake air temperatures as shown by hatching in FIG. 3. Particularly at −20° C. in the cold area, the compensation within the bridge circuit is insufficient and the air flow quantity signal having a shorter pulse width than that corresponding to the actual intake air quantity is produced.

Figure 4:
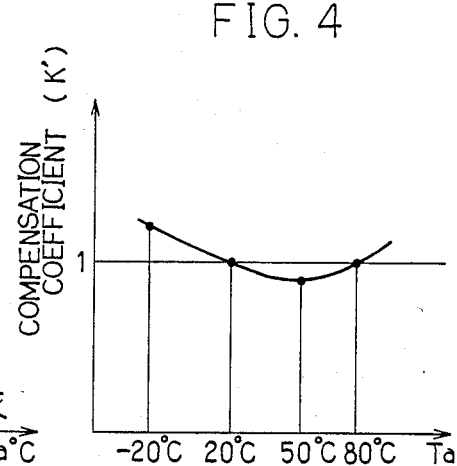
FIG. 4 is a graph showing compensation coefficients stored in a memory relative to air temperature.

This error in the temperature compensation is a function of the intake air temperature. Therefore, an air flow quantity signal Tout produced by the air flow sensor is further compensated by a compensation coefficient K' dependent on the intake air temperature. Since the voltage $V_k$ at the junction B of the bridge circuit corresponds to the air temperature, the voltage $V_k$ is applied to the control unit 11. The compensation coefficient K' is determined to be KA/KB as shown in FIG. 4 and stored in a storage memory such as ROM provided in the control unit 11 as a data map. The compensation coefficient K' is read out in the control unit 11 in correspondence to the signal $V_k$ indicative of the air temperature sensed by the temperature sensitive resistor 14. By multiplying the air flow quantity signal Tout by the compensation coefficient K' read out from the memory, an air flow quantity measurement with reduced compensation error is obtained.

The electronic control unit 11 which primarily performs the above-described temperature compensation on the air flow quantity signal Tout and controls fuel injection quantity or the like in accordance with the compensated air flow quantity, is comprised of a well-known micro-computer having A/D converter, CPU, ROM, ROM, RAM and so on. The ROM stores therein the compensation coefficients corresponding to air temperatures −20° C., 20° C., 50° C. and 80° C. and a control program shown in FIGS. 5 through 7 which the CPU performs.

Figure 5:
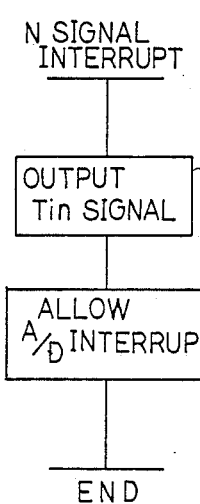
FIGS. 5 through 7 are flow charts showing interrupt routines performed by an electronic control unit shown in FIG. 1.
Figure 6:
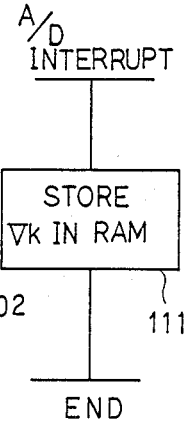

FIG. 5 shows an interrupt routine responsive to rotation N signal for initiating air flow quantity measuring operation of the air flow sensor. At step 101 the start signal Tin is produced in response to the signal N synchronized with the engine rotation so that the heating electric power is supplied to the bridge circuit, and at step 102 an interrupt for A/D conversion of the signal $V_k$ indicative of air temperature is instructed or allowed. In an A/D conversion interrupt routine shown in FIG. 6, the signal $V_k$ received from the bridge circuit is A/D converted by the A/D converter and resultant value indicative of the air temperature is stored at step 111 in RAM in the control unit 11.

Figure 7:
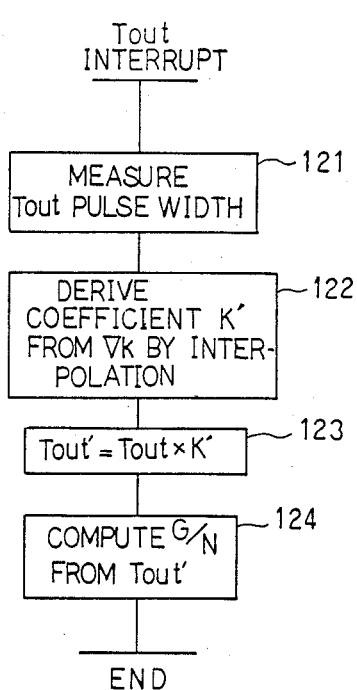

FIG. 7 shows an interrupt routine for measuring the pulse width of the air flow quantity signal Tout when the above-described air flow quantity measurement operation is performed in response to the start signal Tin. At step 121 the pulse width of the air flow quantity signal in the form of pulse shown in (B) of FIG. 2 is measured. This measurement is performed by counting clock signals generated within the control unit 11 during the pulse width. Then at step 122 the compensation coefficient K' is computed by interpolation of the mapped data shown in FIG. 4 based on the air temperature Ta. At step 123 multiplication of Tout×K' is performed to compensate the temperature dependency of the air flow quantity signal Tout and at step 124 the air flow quantity per engine revolution G/N is computed from the compensated air flow quantity Tout'. In the control unit 11, control information for the engine such as fuel injection quantity and ignition timing are calculated from the air flow quantity information G/N and further corrected by detection signals indicative of other engine operating conditions in the well-known manner so that engine control is performed.

Here it should be noted that most appropriate timing for A/D conversion of the temperature signal $V_k$ is tens of microseconds after the start signal Tin. This timing corresponds to the sum of a time interval from the start signal Tin to the supply of the heating electric power to the bridge circuit and the time interval from the supply of the electric power to the stabilization of the temperature signal $V_k$.

Figure 8:
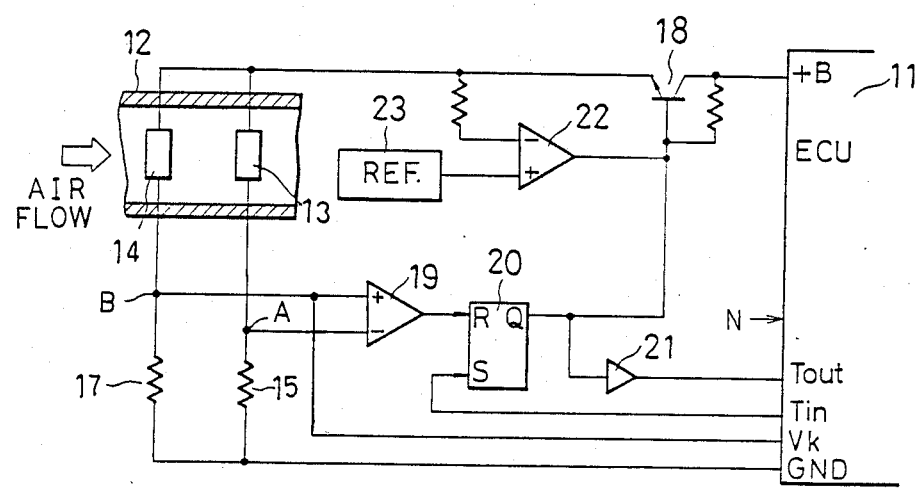
FIG. 8 is a schematic view showing another embodiment of the present invention.

Although the compensation resistor 16 is provided in the bridge circuit for initial temperature compensation in the above-described embodiment, the compensation resistor 16 may be eliminated as shown in FIG. 8. In this case the compensation coefficient K must be determined to correspond to the value KA shown by the curve A in FIG. 3 and stored in ROM in the control unit 11 so that the air flow quantity signal Tout can be compensated for temperature solely by the stored compensation coefficient KA.

It is to be noted that the bridge circuit including the heater resistor may be supplied with a constant current in place of the constan voltage.

What we claim is:

1. A control apparatus for an engine having an intake passage comprising:
    first means positioned in said intake passage for generating heat when supplied with electric power and generating a first output signal indicative of the temperature thereof varying with the supplied electric power and the quantity of air flowing in said intake passage;
    second means for sensing the temperature of air flowing to said first means in said intake passage and generating a second output signal indicative of a reference temperature dependent on the sensed temperature of air;
    third means for regulating the electric power supplied to said first means in accordance with a difference between said first output signal and said second output signal so that the temperature of said first means attains said reference temperature;
    fourth means for measuring the quantity of air flowing in said intake passage in accordance with the electric power regulated by said third means;
    fifth means for storing therein compensation values as a nonlinear function of temperature of air, said compensation values corresponding to errors in the measured quantity of air at respective temperature of air;
    sixth means for determining a compensation value from the stored compensation values in correspondence to the sensed temperature of air;
    seventh means for compensating the measured quantity of air by the determined compensation value; and
    eighth means for controlling said engine using the compensated quantity of air.

2. A control apparatus according to claim 1, wherein said first means includes a first temperature-dependent resistor and a first fixed resistor connected in series with said first temperature-dependent resistor to generate the first output signal at the junction therebetween, and wherein said second means is connected in parallel with said first means and includes a second temperature-dependent resistor and a pair of second fixed resistors connected in series with said second temperature-dependent resistor to generate the second output signal at the junction between said second fixed resistors so that one of the second fixed resistors connected to said second temperature-dependent resistor reduces errors in the measured quantity of air as a linear function of the temperature of air.

3. A control apparatus according to claim 2, wherein the compensation values stored in said fifth means correspond to multiplication coefficients proportional to a difference between the nonlinear function and the linear function of the temperature of air, and wherein said seventh means compensates the measured quantity of air by multiplying the measured quantity of air by a multiplication coefficient determined from the multiplication coefficients.

4. A control apparatus according to claim 3, wherein said third means includes:
    comparator means for comparing the first output signal with the second output signal thereby to generate a comparator output signal when the first output signal attains the second output signal; and
    switching means for initiating and terminating supply of the electric power to said first means in response to a start signal generated in synchronism with rotation of said engine and in response to the comparator output signal, respectively.

5. A control apparatus according to claim 4, wherein said fourth means measures the interval of time of supply of the electric power to said first means to measure the quantity of air.

6. A control apparatus for an engine having an intake passage comprising:
    a first circuit including a heater resistor disposed in said intake passage and a fixed resistor connected in series with said heater resistor, said heater resistor generating heat when supplied with an electric power and varying a resistance thereof in accordance with temperature thereof thereby to produce a first output signal corresponding to the temperature thereof;
    a second circuit connected in parallel to said first circuit and including a temperature sensitive resistor disposed upstream said heater resistor in said intake passage and a pair of fixed resistors connected in series with said temperature sensitive resistor, said temperature sensitive resistor varying a resistance thereof in accordance with temperature of air flowing therethrough thereby to produce a second output signal corresponding to the temperature of air;

a third circuit connected to said first circuit and said second circuit for producing a third output signal which regulates the electric power supplied to said heater resistor in relation to said first output signal and said second output signal;

a fourth circuit connected to said second circuit and said third circuit and storing therein compensation coefficients predetermined in relation to temperature of air, said fourth circuit including a computer programmed to determine in response to the second output signal a compensation coefficient from the stored compensation coefficients and compensate the third output signal by the determined compensation coefficient so that quantity of air is indicated by the compensated third output signal and said engine is controlled thereby.

7. A control apparatus according to claim 6, wherein said third circuit includes:

a comparator for comparing the first output signal with the second output signal to produce a comparator output signal when the first output signal attains the second output signal;

a bistable circuit set and reset by a start signal periodically produced and the comparator output signal, respectively, for producing a pulse signal as the third output signal while the same is in the set condition; and a switching device connected to said bistable circuit for supplying an electric current to said first circuit while turned on by the pulse signal.

8. A control apparatus according to claim 7, wherein said fourth circuit is further programmed to measure the time interval of the pulse signal produced by said bistable circuit so that the measured time interval is compensated by multiplying the measured time interval by the determined compensation coefficient.

* * * * *